United States Patent

[11] 3,598,018

| [72] | Inventor | John M. J. Varga |
| | | Lytton Cottage, Toothhill Lane, Brighouse, Yorkshire, England |
| [21] | Appl. No. | 826,635 |
| [22] | Filed | May 21, 1969 |
| [45] | Patented | Aug. 10, 1971 |
| [32] | Priority | May 25, 1968 |
| [33] | | Great Britain |
| [31] | | 25123/68 |
| | | Continuation-in-part of application Ser. No. 657,649, Aug. 1, 1967. |

[54] CONTROL MEANS FOR A MACHINE TOOL
13 Claims, 2 Drawing Figs.

| [52] | U.S. Cl. | 91/37 |
| [51] | Int. Cl. | F15b 21/02 |
| [50] | Field of Search | 91/35—37 |

[56] References Cited
UNITED STATES PATENTS

| 2,628,539 | 2/1953 | DeNeergaard | 91/37 UX |
| 2,822,531 | 2/1958 | Carroll | 91/37 UX |
| 3,119,291 | 1/1964 | Mizunuma et al. | 91/37 UX |

*Primary Examiner*—Everette A. Powell, Jr.
*Attorney*—Bierman and Bierman

ABSTRACT: Control means for a machine tool having a member which needs to be moved in accordance with a predetermined program, said control means comprising a magnetizable surface adapted to be prerecorded with a pair of magnetic wavelength modulated waveform tracks, and a pair of pickup heads adapted to detect the waveforms and thus cause the member to be moved at speed which are dependent upon the ratio of the frequencies detected by the pickup heads.

CONTROL MEANS FOR A MACHINE TOOL

This application is a continuation-in-part of our currently pending application for patent, Ser. No. 657,649 filed on Aug. 1, 1967 and entitled "Control Means For A Machine Tool."

This invention concerns control means for a machine of the kind (hereinafter termed of the kind referred to) having at least one movable member which needs to be moved in accordance with a predetermined program for example a member of a machine tool which is adapted to carry a cutting tool into engagement with a workpiece or vice versa, or a mechanical hand of a work handling machine.

In our copending Patent application Ser. No. 657,649 filed Aug. 1, 1967 we have described control means for a machine of the kind referred to comprising a magnetizable surface adapted to be prerecorded with a magnetic wavelength modulated wave form and a magnetic waveform of constant wavelength along parallel tracks and adapted to be reciprocated past pickup heads adapted to detect said waveforms at speeds which are proportional to the speeds of reciprocating movements of said movable member, and means for controlling the movements of said movable member in response to the outputs of said pickup heads such that the speeds of movement of said movable member is dependent upon the ratio between the frequencies detected by said two pickup heads.

According to the present invention the control means aforesaid is modified in that said two waveforms are both adapted to be of wavelength modulation form. The invention will be further apparent from the following description which concerns, by way of example only, control means embodying the invention as applied to a turret lathe and with reference to the figures of the accompanying drawings.

Figure 1:
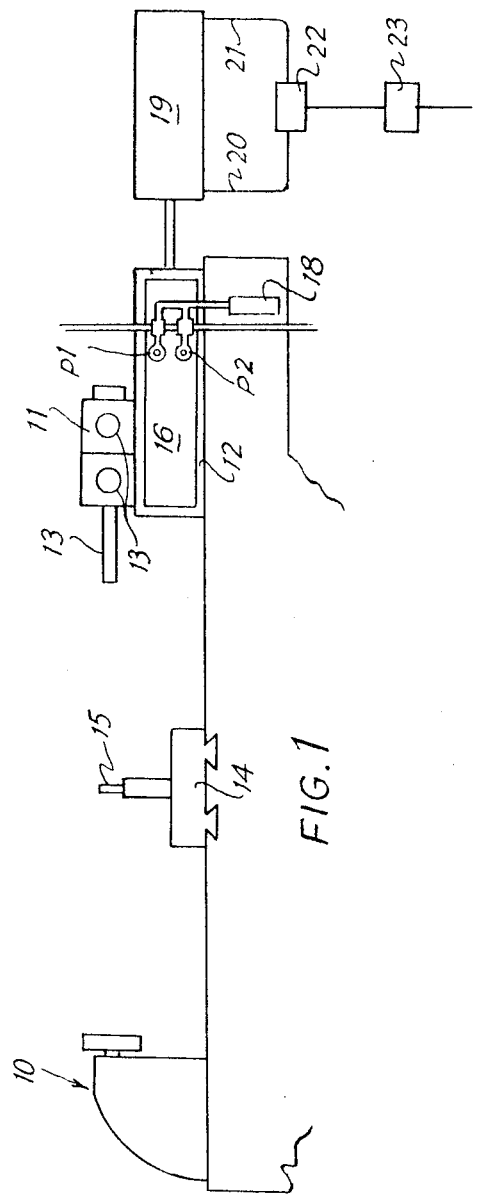
FIG. 1 shows a diagrammatic side elevation of the turret lathe.

Referring now to FIG. 1, it will be seen that the lathe is of known kind having a headstock 10, a turret 11 mounted on a turret slide 12 which is reciprocable towards and away from the headstock and which turret 11 may be indexed to bring a series of different tools 13 carried thereby in turn to an operational station, and a cross-slide 14 which is reciprocable in a direction transverse to the axis of the lathe and which will normally carry a parting-off tool 15.

The turret slide 12 carries a length of magnetic recording tape 16 which is rigidly secured thereto for reciprocating movement therewith past two pickup heads $P_1$ and $P_2$ adapted to detect signals which have been prerecorded on the tape 16. The tape 16 has as many pairs of parallel tracks of wavelength modulated waveform as movements of the turret (both forwardly and rearwardly) are required in any machining cycle and the pickup heads $P_1$ and $P_2$ are carried by means generally indicated at 18 adapted to align them with each pair of wavelength modulated tracks in turn.

The turret slide 12 is adapted to be driven by a double-acting hydraulic cylinder 19 adapted to be fed with pressure oil via reversible valve means 22 from adjustable valve means 23 whereby the supply of oil to the hydraulic cylinder 19 can be adjusted to vary the speed of movement of the turret slide 12 in one or other direction.

When the turret slide 12 is in motion, the outputs from the two pickup heads $P_1$ and $P_2$ are used to control the setting of the adjustable valve 23 and hence the speed of the slide.

Figure 2:
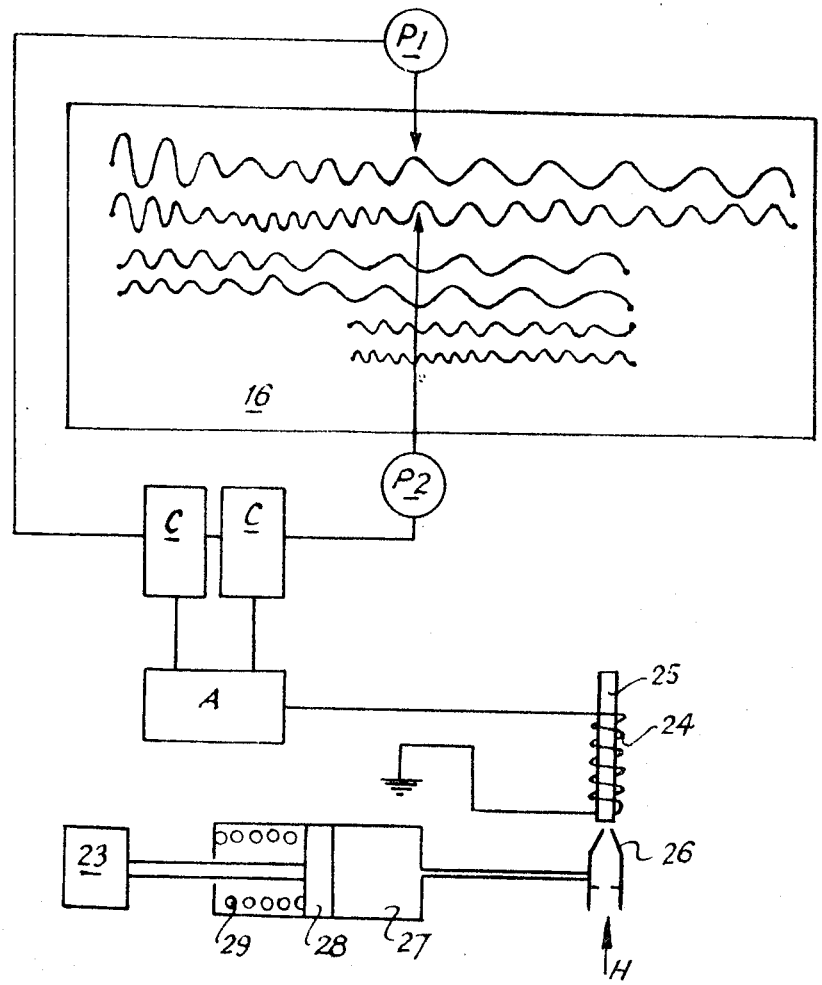
FIG. 2 shows a schematic diagram of the control means for the turret slide of the lathe of FIG. 1.

Thus as can be seen from FIG. 2 the outputs from the pickup heads $P_1$ and $P_2$ are passed to frequency to voltage converters C (that is digital to analogue converters). The outputs from the converters C are fed to an amplifier A which is designed to amplify the signal from the converter fed from the pickup $P_2$ by a factor which is inversely proportional to the amplitude of the signal fed from the converter fed from the pickup $P_1$.

Thus the output X from the amplifier A is given by the following formula:

$$X = (K/V_1)V_2$$

where $V_1$ is the amplitude of the voltage from the converter associated with pickup $P_1$, $V_2$ is the amplitude of the voltage from the converter associated with pickup $P_2$, and $K$ is a constant.

Now $V_2$ is inversely proportional to $\lambda_2$
and $V_1$ is inversely proportional to $\lambda_1$
where $\lambda_2$ and $\lambda_1$ are the wavelengths of the the tracks being sensed by the pickups $P_2$ and $P_1$ respectively at any instant. Thus $X = K'(\lambda_1/\lambda_2)$ where $K'$ is a constant.

The output from the amplifier A which as we have seen in proportional to the ratio of the frequencies sensed by the two pickups at any instant is fed to a coil 24 having a vertical axis. A ferrous rod 25 is disposed within the coil 24 and rests under the influence of gravity with its lower end over an hydraulic nozzle 26.

The nozzle 26 is supplied with pressure oil in the direction of the arrow H. Pressure oil is bled from just behind the nozzle 26 and fed to one end of an hydraulic cylinder 27 to urge the piston 28 thereof forwardly against the action of a compression spring 29. The piston 28 is connected with the adjustable valve 23 to control the setting thereof.

It will be understood that the setting of the valve 23 which controls the speed of movement of the turret slide 12 is dependent upon the distance between the lower end of the rod 25 and the nozzle 26 and hence upon the amplitude of the output from the amplifier A and the ratio between the frequencies detected by the two pickups $P_1$ and $P_2$.

The end of each pair of wavelength modulated tracks corresponds with the desired stopping position of the turret 11 on the pass corresponding to those tracks. When this is sensed by the absence of an output from the pickup heads, the reversible valve 22 is operated and the pickup heads are moved into alignment with the appropriate pair of tracks for the next pass of the turret 11. These latter operations can be effected by solenoid devices for example and need not be described in detail for a full understanding of the invention. The reversal of the valve 22 of necessity causes the turret slide 12 to commence movement in the opposite direction thereby bringing the control tracks for the new movement under the pickup heads. Clearly the pairs of tracks for consecutive movements are laterally adjacent and the end of each track is in transverse alignment with the start of the following track.

In order to prevent premature reversal of the turret 11 due to a temporary stoppage of the turret 11 due to any particular machining operation it is desirable to provide some additional recorded information on the tape which must be sensed before reversal can take place.

Thus for example the wavelength modulated tracks may have amplitude modulation at their ends (see upper pair of tracks of FIG. 2) reversal being impossible until such amplitude modulation has been detected by the pickup heads.

Again a continuous track of waveform of constant wavelength may be provided on the tape 16 such track extending continuously from one end of the tape to the other and having a further pickup head sensitive thereto. In this arrangement means would be provided to prevent reversal of the turret if the further head gave no output, indicating that the absence of signal from the first head was due to stoppage and not necessarily the end of a pair of turret control tracks.

The speed and direction of rotation of the spindle of the headstock of the lathe may also be controlled during each movement of the turret by additional pairs of recorded tracks on the tape and pickup heads realignable as before therefor. Again the output from the spindle speed pickup heads would be compared, the ratio between the two frequencies being used to control the speed of the spindle in any suitable manner.

An additional track or tracks may be provided on the tape which would have prerecorded pulses to effect indexing of the turret at appropriate stages in the machining cycle, to effect deactivation of turret control mechanism and simultaneous activation of a similar control mechanism for the cross-slide when required and to effect realignment of the entire system at the end of each machining cycle ready for the subsequent cycle.

The cross-slide would carry its own tape which would function for the control of the cross-slide in the same manner as has been described in connection with the turret and which would effect reactivation of the turret control means at an appropriate time in each machining cycle.

In this embodiment the required control tapes may conveniently be recorded on the lathe by its manual operation with recording heads giving constant frequency outputs having a desired and predetermined ratio therebetween positioned in place of the pickup heads. An operator would take the lathe through the required machining cycle thereby recording the program on the tape. Such operation determines the proper starting and stopping positions for the slides. It is not necessary for the operator to produce the proper speeds manually since there will be governed by playback by the ratio between the frequencies set which ratio will not change due to erratic manual operation of the lathe.

Again, the tapes may be recorded on a special machine which progresses the tapes past suitable recording heads. In a special case, when a tape is moving at constant speed while being recorded by recording heads which are supplied with constant frequencies to record instructions for a movement to take place at constant speed the wavelength modulation of both tracks of the pair would be zero.

Instead of tapes, drums could be used and such would be geared to the turret such that their angular position at any time was proportional to displacement of the turret from a zero position.

Accuracy of the system is clearly limited by the minimum distance at which distinct peaks can be recorded on the tape. In order to obtain a workable frequency from the tape when it is passing the pickup heads at very slow speeds then the impulses from the pickup head may be increased by multiplying the sensed frequencies electronically.

Fine adjustments may be made in various ways after the lathe has been set up with prerecorded control tapes or drums. Thus, for example, the axial or angular position of one or more pickup heads may be varied or means may be provided to permit axial or angular adjustment of the position of the tape or drum relative to the position of the turret slide and the tape or drum may be at least partially rerecorded on the lathe by movement either of the recording head or the tape or drum prior to rerecordal with subsequent return thereof to its original position.

It will be appreciated that it is not intended to limit the invention to the above example only, many variations, such as might readily occur to one skilled in the art, being possible, without departing from the scope thereof.

Thus, while the control system has been described with reference to a turret lathe and more particularly to the turret slide of such a lathe, and an indication has been given of the application of the system to other functions of the lathe, it is clear that many other kinds of machine could be controlled in accordance with the invention.

Other machines such as work handling devices can equally readily be controlled with apparatus for the invention and in this connection it should be noted that the most complex movements in three dimensions can be regarded as superimposed reciprocating movements in each of three linear directions and can be controlled accordingly.

I claim:

1. A method of controlling machine motion by use of at least a pair of prerecorded magnetic wavelength modulated waveform tracks, at least one pickup head for each track and means for controlling said machine motion comprising the steps of moving said heads and tracks relative to each other, each head generating a signal proportional to the rate of relative movement between the head and its associated track, multiplying one of said signals by a signal inversely proportional to the other said signal to generate a control signal, and applying said control signal to said means to control said machine motion.

2. The method specified in claim 1 wherein the signal generated by each head is a frequency signal and further comprising the step of converting each frequency signal to a direct-current voltage signal before multiplication by said inversely proportional signal.

3. Apparatus for controlling machine motion in a machine having at least one movable member comprising at least one magnetic surface having a plurality of prerecorded magnetic wavelength modulated waveform tracks thereon, a plurality of pickup heads relatively movable with respect to said tracks, one for each track, each head producing a signal proportional to the relative movement between said track and head, means for inverting the value of one said signal and for multiplying the other said signals by the said inverted signal to produce a control signal, and control means responsive to the said control signal for controlling the movement of said movable member.

4. The apparatus specified in claim 3 wherein said tracks are placed parallel to each other on said surface.

5. The apparatus specified in claim 3 wherein said magnetic surface is mounted on the said movable member.

6. The apparatus specified in claim 3 wherein said heads generate a frequency signal, and at least one frequency to voltage converter for producing an output voltage signal proportional to said frequency signal.

7. The apparatus specified in claim 3 wherein said magnetizable surface has a plurality of pairs of tracks each of which is of wavelength-modulated waveform, there being one such pair of tracks for movement of said movable member in each direction required in a predetermined operational machine cycle, means for aligning said pickup heads with another pair of tracks when the function of movement of the movable member is changed and means for reversing the direction of movement of said movable member at the end of each said pair of tracks whereby said movable member automatically executes the entire program of said operational cycle.

8. The apparatus specified in claim 7 wherein the end of each of said tracks is provided with an amplitude modulated waveform, said pickup heads being adapted to sense said amplitude modulated waveform, and means for preventing direction reversal of said movable member until said amplitude modulated waveform has been sensed.

9. The apparatus specified in claim 7 wherein means are provided to prevent reversal of said movable member in the absence of an output from a pickup head adapted to sense a track of waveform of constant wavelength whereby premature reversal due to temporary stoppage is avoided.

10. The apparatus specified in claim 3 comprising more than one movable member, each said movable member having a magnetic surface and a plurality of pickup heads associated therewith.

11. The apparatus specified in claim 3 wherein said control means comprises a double-acting hydraulic cylinder, an adjustable valve connected to said cylinder, an adjustable valve connected to said cylinder, said hydraulic cylinder being fed with pressure oil by said adjustable valve, the setting of said adjustable valve being continuously controlled in accordance with said control signal.

12. The apparatus specified in claim 3 further comprising a coil and a bar of ferrous material, said bar being mounted within said coil, the combination of bar and coil having their axes disposed in the vertical direction, said coil being adapted to receive said control signal, said bar being adapted to change its vertical position in response to variations in said control signal, a hydraulic nozzle, said hydraulic nozzle being mounted under said bar and adapted to be supplied with a hydraulic fluid, the pressure of said hydraulic fluid in said nozzle being dependent on the distance of said bar from said nozzle, a bleeder tube mounted behind said nozzle for bleeding pressurized hydraulic fluid from said nozzle, said bleeder tube being in fluid communication with said control means, whereby pressure variations in said bleeder tube cause said control means to proportionally vary the motion of said movable member.

13. The apparatus specified in claim 12 wherein said control means comprises a double-acting hydraulic cylinder, piston means mounted in said cylinder, one side of said piston being in fluid communication with the said bleeder tube, a compression spring mounted in said cylinder and against the other side of said piston to provide a return force against said piston when the pressure in said bleeder tube drops below a predetermined pressure, an adjustable valve connected to said piston wherein movement of the said piston controls the setting of the adjustable valve, said adjustable valve being adapted to control movement of said movable member.